United States Patent [19]

Hawkins et al.

[11] Patent Number: 4,555,833
[45] Date of Patent: Dec. 3, 1985

[54] MECHANICAL PLUG DRILL

[75] Inventors: Phillip J. Hawkins, Penn Hills; Edward J. Choby, Irwin, both of Pa.

[73] Assignee: Westinghouse Electric Corp., Pittsburgh, Pa.

[21] Appl. No.: 588,422

[22] Filed: Mar. 12, 1984

[51] Int. Cl.$^4$ ............................................. B23B 45/04
[52] U.S. Cl. .................................... 29/33 T; 29/426.5; 29/726; 408/58; 408/130
[58] Field of Search ....................... 408/56, 58, 81, 82, 408/129, 130, 204; 29/726, 426.5, 337

[56] References Cited

U.S. PATENT DOCUMENTS

| | | | |
|---|---|---|---|
| 3,704,074 | 11/1972 | Deschner | 408/130 X |
| 4,369,569 | 1/1983 | Armstrong et al. | 29/726 |
| 4,443,139 | 4/1984 | Eash | 408/130 X |
| 4,498,820 | 2/1985 | Brennan | 408/82 X |

FOREIGN PATENT DOCUMENTS 2096030 10/1982 United Kingdom ................. 408/58

Primary Examiner—Eugene F. Desmond
Attorney, Agent, or Firm—L. A. DePaul

[57] ABSTRACT

A device for removing plugs from plugged tubes in a steam generator including a frame having a substantially flat plate, with a hollow drill bit mounted thereon and movable generally perpendicularly with respect thereto from a storage position to an operating position. An elongated retaining pin extends through the hollow drill bit and therebeyond having threads on one end thereof for attachment to the plug to be drilled. Actuating means moves the drill bit between the storage position thereof and the operating position thereof, motor means is mounted on the frame for rotating the drill bit. An air-water mixture is introduced near where the drill bit meets the plug to be drilled, the water being present in an amount of about one-half volume percent, and a vacuum is used to collect and remove the air-water mixture and any debris entrained therewith due to drilling the associated plug.

20 Claims, 5 Drawing Figures

U.S. Patent   Dec. 3, 1985   Sheet 1 of 3   4,555,833
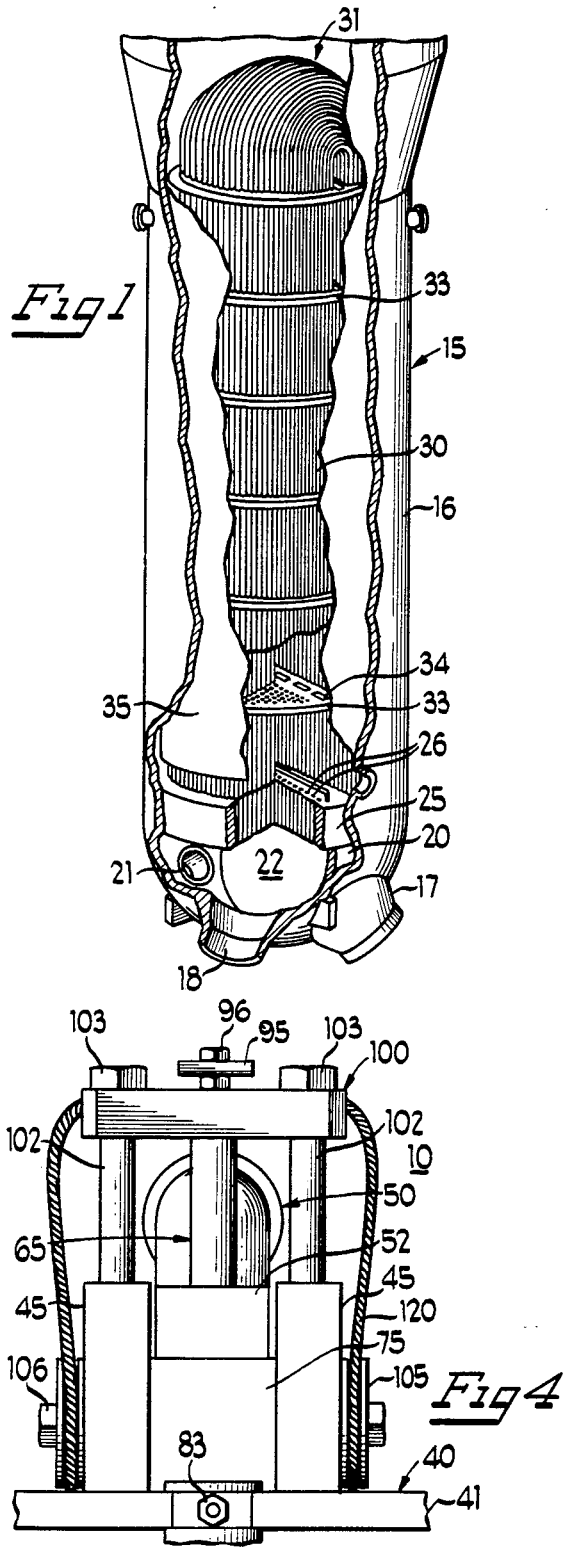
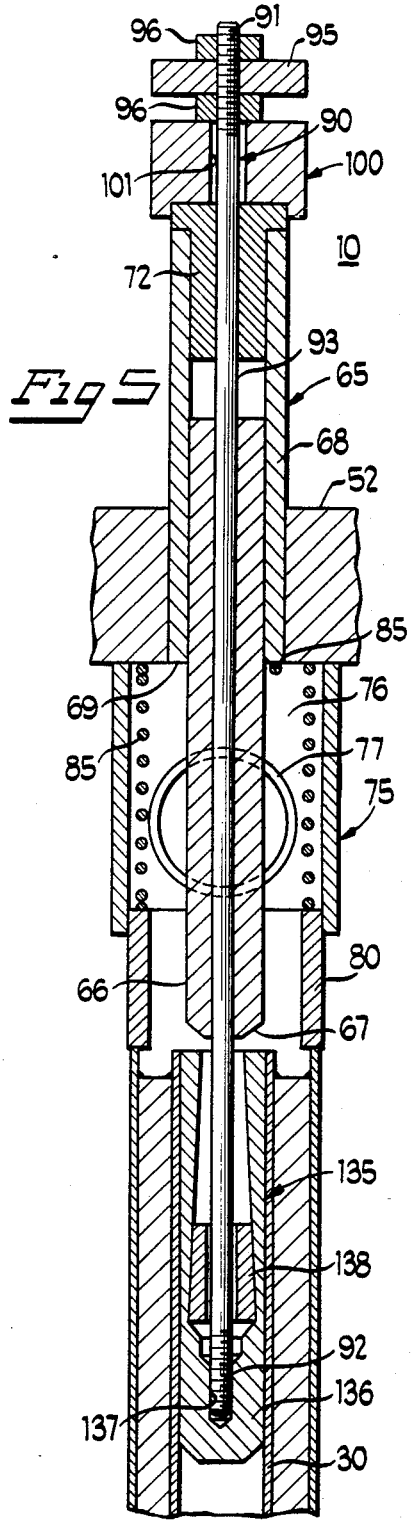

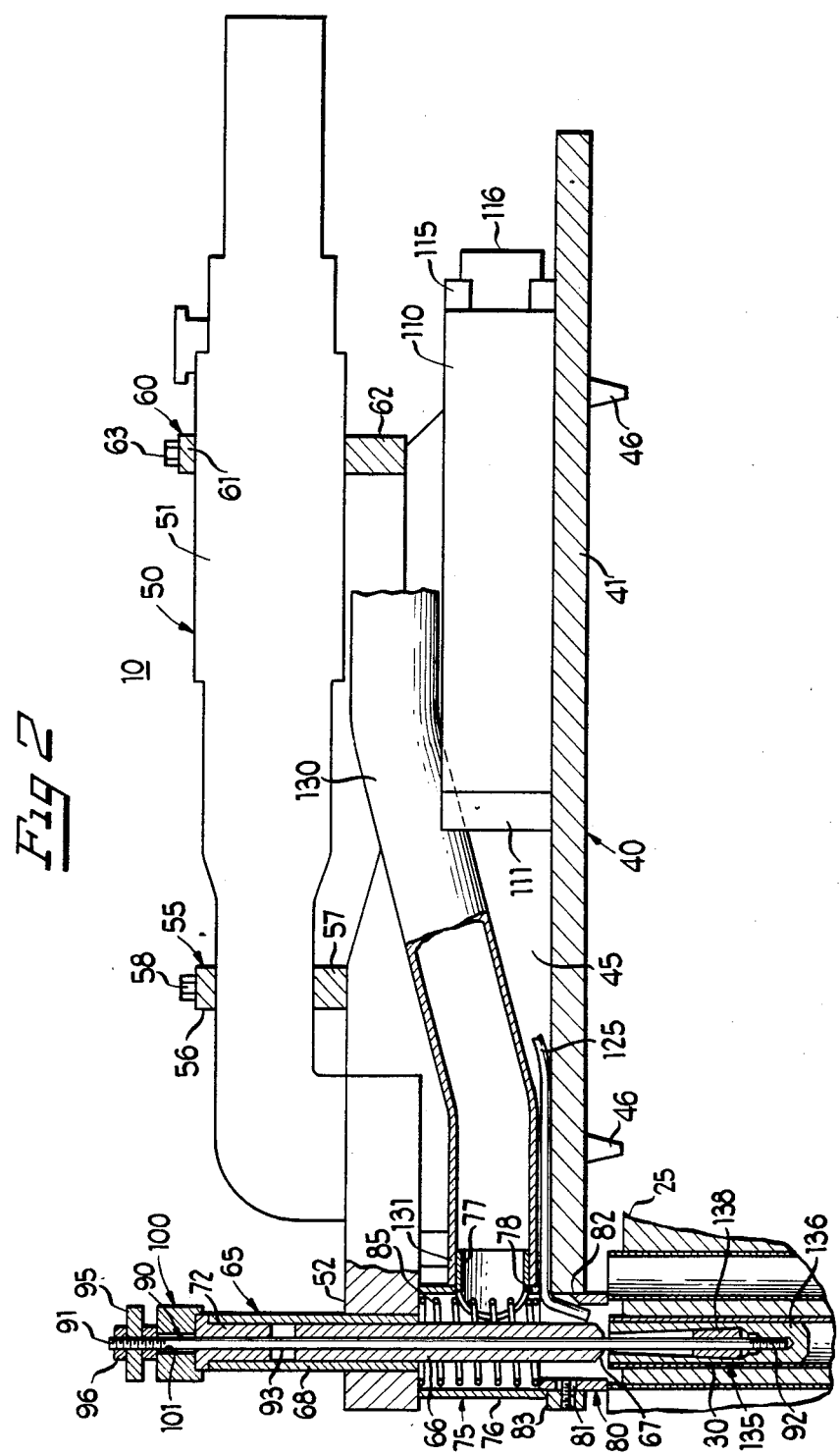

MECHANICAL PLUG DRILL

BACKGROUND OF THE INVENTION

This invention relates to a mechanical plug drill for removing plugs from plugged tubes in a steam generator.

A typical nuclear steam generator comprises a vertically oriented shell, a plurality of U-shaped tubes disposed in the shell so as to form a tube bundle, a tube sheet for supporting the tubes at the ends opposite to the U-curvature, and a dividing plate that cooperates with the tube sheet forming a primary fluid inlet plenum at one end of the tube bundle and a primary fluid outlet plenum at the other end of the tube bundle. The area below the tube sheet formed by the inlet and outlet plenums is the channel head where some of the repair and maintenance work on the steam generator is performed.

The primary fluid having been heated by circulation through the nuclear reactor core enters the steam generator through the primary fluid inlet plenum. From the primary fluid inlet plenum, primary fluid flows upwardly through the first openings in the U-tubes near the tube sheet which supports the tube, through the U-tube curvature, downward through the second openings in the U-tubes near the tube sheet, and into the primary fluid outlet plenum. At the same time, a secondary fluid known as feedwater is circulated around the U-tubes in heat transfer relationship therewith, thereby transferring heat from the primary fluid in the tubes into the secondary fluid surrounding the tubes causing a portion of the secondary fluid to be converted to steam.

Since the primary fluid contains radioactive particles and is isolated from the secondary fluid by the U-tube walls and the tube sheet, it is important that the U-tubes and the tube sheet be maintained defect-free so that no breaks will occur in the U-tubes or in the walls between the U-tubes and the tube sheet, thus preventing contamination of the secondary fluid by the primary fluid.

The tubes in steam generators are subjected to flow induced vibration, chemical corrosion, as well as temperature gradients, all of which cause the tubes to degrade. When certain of the tubes in the tube bundle degrade due to the above set forth factors, it is necessary to plug the degraded tubes in order to prevent contamination of the secondary fluid by the primary fluid. However, in some cases it is desirable to unplug the plugs either for repair or for sleeving. Sleeving is a process whereby the defects in the tube wall are cured by inserting a sleeve thereinto, thereby enabling the tube to be put back into service. Various types of plugs are used to plug degraded tubes in a steam generator, but whatever type of plug is employed, it must be removed in order for the degraded tube to be available for repair or reconstruction.

Because the channel head is a relatively small area in which to work, it is required that whatever apparatus or device is used to remove the plugs from the plugged tubes in the tube bundle be capable of being operated in a relatively small space. In addition, because the channel head is radioactive, the device by necessity must be easy to manipulate and capable of removing plugs from plugged tubes in a relatively short period of time so as to prevent personnel from prolonged radiation exposure.

What is needed is a device or apparatus for removing plugs from plugged tubes within a tube bundle in a steam generator which is relatively small and easy to manipulate yet is capable of quickly removing plugs from plugged tubes, thereby reducing radiation exposure to maintenance personnel.

SUMMARY OF THE INVENTION

A device for removing plugs from plugged tubes in a steam generator wherein the device is relatively lightweight, easy to mount to the associated tube sheet, and which can be operated within the narrow confines of the channel head so as to quickly and efficiently remove the plugs from plugged tubes in the steam generator.

Accordingly, it is an object of the present invention to provide a device for removing plugs from plugged tubes in a steam generator which includes a frame, a drill bit assembly mounted on the frame and movable with respect thereto from a storage position to an operating position, motor means mounted on the frame for rotating the drill bit, means for introducing an air-water mixture near where the drill bit meets the plug to be drilled, and collection means connected to the source of low pressure for collecting and removing the air-water mixture and any debris entrained therewith due to drilling the associated plug.

Another object of the invention is to provide a device of the type set forth including an elongated retaining and centering pin extending longitudinally through a hollow drill bit and therebeyond and is provided with screw threads at one end thereof for securing a portion of the plug to be drilled to the pin.

Yet another object of the invention is to provide a device of the type set forth in which the actuating means for moving the drill bit from the storage position thereof to the operating position thereof converts movement horizontal to the tube sheet into movement generally perpendicular to the tube sheet.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction, and operation, and many of its advantages should be readily understood and appreciated.

FIG. 1 is a partial cross-sectional view in elevation of a portion of a typical steam generator;

FIG. 2 is a partial cross-sectional view in elevation of the mechanical drill plug;

FIG. 4 is a front elevational view of the device illustrated in FIG. 2 as seen from the left-hand side thereof; and FIG. 5 is a sectional view of the drill bit assembly and retaining pin of the device illustrated in FIG. 2.

DESCRIPTION OF THE PREFERRED EMBODIMENT

Figure 3:
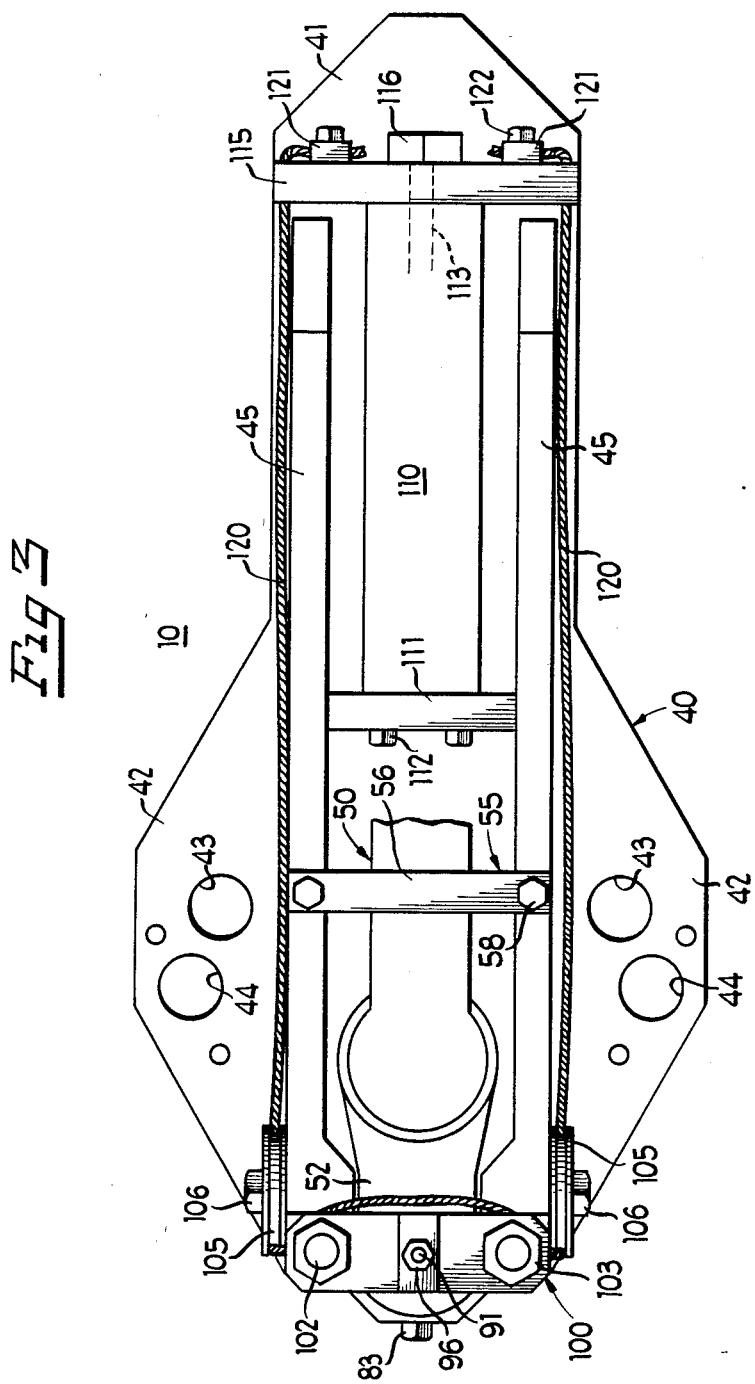
FIG. 3 is a top plan view of the device illustrated in FIG. 2 with certain parts removed.

Referring now to the drawings and particularly to FIGS. 1 and 2 thereof, there is a plug drill 10 which is useful in a steam generator 15 to remove plugs 135 from tubes 30 in the steam generator. More particularly, as seen in FIG. 1, the steam generator 15 comprises an outer shell 16 with a primary fluid inlet nozzle 17 and a primary fluid outlet nozzle 18 attached near the lower end of the shell. A generally cylindrical tube sheet 25 having tube holes 26 therein is also attached to the outer shell 16 near its lower end defining therewith a channel head 20. A dividing plate 22 in the channel head 20 attached to both the tube sheet 25 and the outer shell 16 divides the channel head into a primary fluid inlet plenum and a primary fluid outlet plenum, as is well understood in the art. Access to the channel head 20 is through a manway 21 provided in the shell 16.

Tubes 30 are heat transfer tubes with a U-curvature disposed within the outer shell 16 and attached to the tube sheet 25 by means of the tube holes 26. Tubes 30 which may number about 7,000 form a tube bundle 31. In addition, a secondary fluid inlet nozzle (not shown) is disposed in the outer shell 16 above the top of the curvature in the tubes 30 for providing a secondary fluid, such as feedwater, which flows downward through an annular space between the outer shell 16 and in inner wrapper 35 and thence upwardly against the tubes 30 of the bundle 31 where a portion of the water is converted to steam which exits the steam generator 15 through a steam outlet at the top thereof, not shown.

A plurality of axially spaced-apart support plates or baffles 33 which, as illustrated, have holes therein axially in registry respectively with the holes 26 in the tube sheet 25, thereby to provide support to the individual tubes 30 in the tube bundle 31. Larger apertures or flow slots 34 are provided in the support or baffle plates 33 to facilitate movement of the secondary fluid or feedwater as well as steam through the steam generator 15.

In operation, the primary fluid which may be water having been heated by circulation through a nuclear core enters the steam generator 15 through the primary inlet nozzle 17 and flows into the primary fluid plenum defined by the dividing plate 22 and the adjacent portion of the outer shell 16. From the primary fluid plenum, the primary fluid flows upwardly through the tubes 30 in the tube sheet 25, upwardly through the U-shaped curvature of the tubes, and thence downwardly through the tubes into the primary fluid outlet plenum and thence through the primary fluid outlet nozzle 18 where the primary fluid is returned to the nuclear core. While flowing through the tubes 30, heat is transferred from the primary fluid to the secondary fluid which surrounds the tube 30 causing some of the secondary fluid to vaporize. The resulting steam then exits the steam generator 15 through the steam outlet nozzle.

Due to the presence of various corrosive elements, temperature gradients encountered by the tubes 30 as well as mechanical vibration induced by the flow of secondary fluid through the steam generator 15, the tubes 30 in the tube bundle degrade with time. Since the primary fluid is radioactive due to its contact with the nuclear core, it is imperative to maintain a strict separation of the primary fluid from the secondary fluid. To that end, when it becomes apparent that individual tubes 30 in the bundle 31 are degrading, it is necessary to plug the tubes so as to prevent the flow of primary fluid thereto.

Various plugs are available which have been successfully used in steam generators to plug the heat transfer tubes therein, and one such plug is disclosed in U.S. Pat. No. 4,390,042 issued to Kucherer et al., on June 28, 1983, the disclosure of which is incorporated herein by reference. Such plugs 135 when inserted into the appropriate tubes 30 are entirely effective to seal the tubes and to remove them from operation, thereby preventing contamination of the secondary fluid or feedwater by contact with the primary fluid, however, there are times when such plugs have to be removed and this has traditionally been accomplished by mechanically drilling the plugs 135 from the associated tubes 30 so as to free the tube for repair or reconstruction.

Because access to the tubes 30 is primarily through the channel head 20, it will be understood that the working space is limited and the device or mechanical plug drill must be specially designed to accommodate the small working space. In addition, certain steam generators do not use U-shaped tubes, but rather straight tubes and when drilling plugs of the type disclosed in the heretofore referenced Kucherer et al. patent, the plug sleeve may fall into the tube if the plug is at the top of the tube. Accordingly, it has been a problem in the past to ensure that a portion of the plug does not fall into the tube where steam generators using vertically oriented straight tubes are used.

In a steam generator 15 of the type disclosed, the plug drill 10 of the present invention must be attached to the bottom of the tube sheet 25, whereby the plug drill 10 in operation will be oriented upside down from the illustrations in FIGS. 2 to 5.

Referring now to FIGS. 2 through 5, it will be seen that the plug drill 10 has a frame 40 in the form of a flat planar plate 41 which is generally rectangular in shape with a pair of outwardly extending wing or extension portions 42 near the front of the frame. The extension portions 42 are provided with two pairs of apertures 43, 44 which are for associated camlocks so that the plug drill 10 may be mounted to the associated tube sheet 25 by means of the camlocks (not shown) inserted through one of the pair of appropriate apertures 43, 44 and into the corresponding holes 26 in the tube sheet, thereby to fixedly mount the plug drill to the tube sheet.

The frame 40 also includes a pair of spaced-apart upstanding side members 45 and a plurality of downwardly extending pins 46 which serve to space the frame 40 from the associated tube sheet 25 a predetermined distance. Pins 46 of various sizes may be provided, as necessary.

A nut runner 50 has a motor housing portion 51 and a drive section 52, with the nut runner 50 being connected to a source of air supply by a hose or connector, not shown. The nut runner 50 is mounted onto the frame 40 by means of spaced-apart clamps 55 and 60. The front clamp 55 has a top plate 56 and a bottom plate 57 maintained together by a pair of spaced-apart fasteners 58. Similarly, the rear clamp 60 is provided with the top portion or plate and a bottom portion 62 connected together by fasteners 63, both the front clamp 55 and rear clamp 60 being fixedly mounted such as by welding or the like to the respective side members 45 of the frame 40.

A drill bit assembly 65 is positioned perpendicularly to the planar member or plate 41 of the frame 40, the drill bit assembly 65 including a hollow, vertically positioned in use elongated drill bit 66 having a cutting end 67 with the portion of the drill bit away from the cutting end 67 being received in a hexagonally shaped sleeve 68 which has a bottom surface 69. A bushing 72 fits inside the sleeve 68 and permits rotation of the sleeve 68 and drill bit 66 with respect thereto, for a purpose hereinafter set forth.

Extending downwardly from the drive section 52 of the nut runner and sealingly connected thereto such as by welding or the like is a chip chamber 75 including a tubular section 76 having a rearwardly extending fitment tube 77 integrally connected thereto such as by welding. A slot 78 is provided in the wall of the tubular portion 76 below the fitment tube 77. Extending downwardly from the chip chamber 75 is an adjustable tube 80, the outer diameter of which is substantially the same as the inner diameter of the chip chamber 75 thereby to provide a slidable but sealing relationship between the chip chamber 75 and the adjustment tube 80. The adjustment tube 80 is provided in the front thereof with a slot 81 and in the rear thereof with a bevelled edge 82 which is in registry with the slot 78 in the tubular section 76 of the chip chamber. A set screw 83 is provided in the slot 81 to provide vertical adjustment of the tube 80 with respect to the chip chamber 75, for a purpose hereinafter set forth. Finally, a coil spring 85 is mounted within the chip chamber 75 and butts against the bottom surface 69 of the sleeve 65 and the top edge surface of the adjustment tube 80, thereby to bias the drill bit assembly 65 into its storage position which is that illustrated in the drawings.

A retaining and centering pin 90 is mounted above the drill bit assembly 65 and has threaded end portions 91 and 92, a shank portion 93 of the pin 90 extending through the hollow drill bit 68 and freely movable with respect thereto, thereby to center the drill bit with respect to the plug 135 and the tube 30. Preferably the pin 90 is centered from a metal harder than the plug 135 to prevent plug chips from becoming embedded in the pin and causing the pin and drill bit 66 to jam. The pin 90 also is threadedly received within a portion of the plug 135, as hereinafter will be explained, both to assist extraction of the plug from the associated tube 30 and to prevent a portion of the plug from falling into the tube when the tube is in a steam generator which utilizes straight tube rather than the U-tubes illustrated herein. The pin 90 has a handle 95 which is maintained in place by a pair of nuts 96 above and below the handle.

A crossbar 100 extends transversely of the frame 40, see particularly FIGS. 3 and 4, consisting of a rectangular bar having a central aperture 101 through which extends the pin 90. Spaced plungers 102 are mounted through appropriate apertures, not shown, in the crossbar 100 and are slidably received within the side members 45 of the frame 40. Each of the plungers 102 has a threaded end which receives an appropriate nut 103 thereby to mount the plungers to the crossbar 100. A pulley 105 is mounted on each side of the frame 40 and specifically on the side members 45, slightly to the rear of the crossbar 100, and maintained in place by a suitable nut 106.

Actuating mechanism in the form of hydraulic cylinder 110 connected to a source of hydraulic fluid, not shown, is mounted to the frame 40 by means of an upstanding mounting plate 111 which has apertures (not shown) through which extend threaded fasteners 112, see FIG. 3, thereby to mount the hydraulic cylinder 110 to the mounting plate 111 and to the frame 40. A piston 113 in the cylinder 110 is connected to a drawbar 115 by means of a retaining bolt 116, the drawbar extending transversely of the frame 40 and being movable with respect thereto. A cable 120 is attached at each end thereof to the drawbar 115 by means of appropriate cable clamps and bolts 122 therefor, the cable 120 extending longitudinally along the frame 40 around the pulley 105 and thence through holes in the crossbar 100 so as to, as best seen in FIGS. 3 and 4, provide vertical movement of the drill bit assembly 65 in response to horizontal movement of the piston 113. A feed tube 125 connected to a source of air and water, not shown, extends through the slot 78 in the chip chamber 75 and over the bevelled edge 82 of the adjustment tube 80 into the area where the cutting end 67 of the drill bit 66 contacts the associated plug 135, thereby to deliver through the feed tube 125 a mixture of water and air, the water preferably being present in an amount of about one-half percent by volume. A vacuum tube 130 connected to a source of low pressure, not shown, has an end 131 thereof which fits over the fitment tube 77 of the chip chamber 75 thereby to provide an area of low pressure to the chip chamber 75 and to the area where the cutting end 67 of the drill bit 66 meets the associated plug 135.

The plug 135 as illustrated is the type shown and claimed in the aforementioned Kucherer et al. U.S. Pat. No. 4,390,042. However, there are other plugs available which may be used in place of the Kucherer et al. plug and the subject invention is entirely adequate to remove any type of plug normally used in plug tubes 30 in the steam generator 15 of the type disclosed whether the generator employs the U-shaped tube illustrated or straight tubes. The plug 135 includes a sleeve portion 136 which is provided at the far end thereof with internal threads which mate with the external threads on the end 92 of the retaining and centering pin 90. The plug 135 also includes an expander member 138 which as described in the Kucherer et al. patent expands the sleeve portion 136 of the plug when the expander member is drawn toward the end of the associated tube 30 thereby to cause a plurality of cylindrical lands or annular flanges longitudinally spaced on the outside periphery of the sleeve portion 136 (not shown) to come into contact with the adjacent tube wall 30 to seal same.

In operation, the plug drill 10 is brought by suitable maintenance personnel into the channel head 20 through the manway 21 and the appropriate plugged tube 30 is located. Thereafter, camlocks (not shown) are inserted through one of the pairs of apertures 43, 44 and extended into adjacent apertures 26 in the tube sheet 25, thereby to mount the plug drill 10 to the bottom of the tube sheet. Camlocks are well known in the steam generator art and are cylindrical members which have an expandable portion when rotated so as to expand in the apertures 26, thereby fixedly mounting the plug drill 10 to the steam generator tube sheet 25 in a position which is inverted with respect to that shown in FIG. 2. A linear potentiometer or like measuring equipment, not illustrated, is used to determine the distance through which the drill bit 66 is moved. This metering equipment is well known in the art and forms no part of this invention.

After the plug drill 10 is thus placed or mounted on the tube sheet 25, the centering and retaining pin 90 is inserted through the hollow drill bit 66 with the threaded portion 92 thereof engaging the threaded portion of the sleeve 136 of the plug 135. Thereafter, the source of vacuum is connected to the vacuum tube 130 and the source of the water-air mixture is connected to the tube 125, thereby to provide a cooling mist of air and water to the cutting end 67 of the drill bit assembly 65 and particularly to the area where the drill bit cutting end contacts the plug 135. Thereafter, the hydraulic cylinder 110 is actuated, thereby to drive the drawbar 115 rearwardly of the frame 40 causing the cable 120 to be pulled downwardly and around the pulleys 105 to move the drill bit assembly 65 downwardly as illustrated in FIG. 2 but upwardly when mounted to the tube sheet 25. This vertical movement of the drill bit assembly is accomplished by movement of the sleeve 68 with respect to the drive section 52 of the nut runner 50. Since the sleeve is hexagonal in cross section, complimentary shaped as is the aperture through the drive section 52, the sleeve may move vertically relative to the drive section 52 without disengaging the nut runner 50 from the drill bit assembly 65.

In any event, the drill bit assembly 65 is moved vertically with respect to the frame 40 and the nut runner 50 by means of the actuating mechanism or hydraulic cylinder 110 thereby to cause the cutting end 67 of the drill bit 66 to come in contact with the outer end of the plug 135, which is the operating position of the drill bit. Thereafter, drilling commences and because the drill bit 66 is of a design such that it rotates in a counterclockwise direction, its rotation does not automatically loosen the pin 90 from its threaded engagement with the sleeve 136. Specifically, the threads 92 are right-handed threads so that they are tightened by clockwise rotation whereas the drill bit 66 is left-hand threaded and is caused to rotate in a counterclockwise direction by the nut runner 50. An additional advantage of this arrangement is that since the drill bit 66 rotates in an opposite direction to the threads 92 of retaining pin 90, any chips or debris caused by drilling will be thrown upwardly, in FIG. 2 but downwardly in actual use, away from the plug 135 and pin 90 thereby to prevent the drill bit 66 and the pin 90 from becoming jammed.

The provision of a mist through tube 125 to the cutting edge 67 of the drill bit 66 provides two important functions. First, the mist cools the drill bit cutting end 67 as well as the shank portion of the drill bit 66, thereby to increase the life of the tool and also to provide a fluid for entraining debris which results during the drilling operation and which is thereafter sucked up through the chip chamber 75 and into the vacuum tube 130 continuously to cool the drill bit and remove debris produced during drilling.

After the plug 135 is drilled a sufficient distance to release same from the associated tube 30, drilling is ceased and the hydraulic cylinder 110 is returned to its original position by allowing the drawbar 115 to move forwardly of the frame 40, thereby releasing the cable 120. The coil spring 85 serves to return the drill bit assembly 65 to its storage position from its operating position, as illustrated in the drawings, by acting against the bottom surface 69 of the sleeve 68 and against the top surface of the adjustment tube 80. Since the adjustment 80 is fixed against the tube sheet 25 or the tube 30 so that sleeve 68 of the assembly 65 which is in sliding relationship with the nut runner 50 moves vertically away from the tube sheet 25, then the sources of vacuum or low pressure and the air-water mixture are interrupted. Thereafter, the camlocks may be released and the plug drill 10 removed from engagement with the tube sheet 25, the plug 135 being retained by the pin 90 so that as the plug drill 10 is removed from the tube sheet 25, the associated plug 135 is extracted. After removal of the plug 135 from the pin 90 the device is ready for subsequent use. An advantage to the subject invention is the total removal of the plug 135, including the sleeve 136, which has not heretofore been possible, as well as the small size of the plug drill 10 that allows all tubes 30 to be serviced, even those near the wrapper 35.

While there has been described what at present is considered to be the preferred embodiment of the present invention, it will be understood that various modifications and alterations may be made therein without departing from the true spirit and scope of the invention and it is intended to cover all such modifications and alterations in the claims appended hereto.

What is claimed is:

1. A device for removing plugs from plugged tubes in a stream generator, said device comprising a frame, a drill bit mounted on said frame and movable with respect thereto from a storage position to an operating position, motor means mounted on said frame for rotating said drill bit, means for introducing an air-water mixture near where said drill bit meets the plug to be drilled, and collection means connectable to a source of low pressure for collecting and removing the air-water mixture and any debris entrained therewith due to drilling the associated plug.

2. The device of claim 1, wherein said drill bit is spring biased to the storage position thereof.

3. The device of claim 1, wherein said motor means is a nut runner.

4. The device of claim 1, wherein said air-water mixture has about one-half volume percent water.

5. The device of claim 1, wherein said collection means includes a chamber substantially surrounding a portion of said drill bit.

6. The device of claim 5, wherein a coil spring is positioned within said chamber biasing said drill bit to the storage position thereof.

7. A device for moving plugs from plugged tubes in a steam generator, said device comprising a frame, a hollow drill bit mounted on said frame and movable with respect thereto from a storage position to an operating position, an elongated retaining pin extending longitudinally through said hollow drill bit and therebeyond having means on one end thereof for securing a portion of the plug to be drilled to said pin, motor means mounted on said frame for rotating said drill bit, means for introducing an air-water mixture near where said drill bit meets the plug to be drilled, and collection means connectable to a source of low pressure for collecting and removing the air-water mixture and any debris entrained therewith due to drilling the associated plug.

8. The device of claim 7, wherein said elongated retaining pin has external threads at said one end thereof for securing a portion of the associated plug thereto.

9. The device of claim 8, wherein said hollow drill bit is rotated in a direction opposite to the threads on said retaining pin.

10. The device of claim 9, wherein said motor means rotates said drill bit counterclockwise.

11. The device of claim 7, wherein said elongated retaining pin is constructed of a steel having a hardness greater than the associated plug material.

12. The device of claim 7, wherein said elongated retaining pin extends through said hollow drill bit and is freely movable with respect thereto.

13. The device of claim 7, wherein the air-water mixture has about one-half volume percent water.

14. A device for removing plugs from plugged tubes in a steam generator, said device comprising a frame, a drill bit mounted on said frame and movable with respect thereto from a storage position to an operating position, actuating means for moving said drill bit between the storage position thereof and the operating position thereof, said actuating means being situated out of axial alignment with said drill bit, motor means mounted on said frame for rotating said drill bit, means for introducing an air-water mixture near where said drill bit meets the plug to be drilled, and collection means connectable to a source of low pressure for collecting and removing the air-water mixture and any debris entrained therewith due to drilling the associated plug.

15. The device of claim 14, wherein said frame includes a planar member with said drill bit extending perpendicularly thereto, said actuating means being mounted on said planar member generally perpendicularly to said drill bit.

16. The device of claim 15, wherein said actuating means is a hydraulic cylinder having a piston thereof lying in a plane parallel to said planar member.

17. The device of claim 16, wherein said drill bit is connected to said hydraulic cylinder piston by a flexible cable to convert motion of said cylindrical piston parallel to said planar member into motion of said drill bit between the storage position thereof and the operating position thereof generally perpendicular to said planar member.

18. The device of claim 14, wherein said collection means is position adjacent to said frame and includes a collection chamber which substantially surrounds a portion of said drill bit.

19. A device for removing plugs from plugged tubes in a steam generator, said device comprising a frame having a substantially flat plate, a hollow drill bit mounted on said substantially flat plate and movable generally perpendicularly with respect thereto from a storage position to an operating position, an elongated retaining pin extending longitudinally through said hollow drill bit and therebeyond having means on one end thereof for securing a portion of the plug to be drilled to said pin, actuating means for moving said drill bit between the storage position thereof and the operating position thereof, said actuating means being constructed and arranged to convert movement parallel to said substantially flat plate into movement of said hollow drill bit, motor means mounted on said frame for rotating said drill bit, means for introducing an air-water mixture near where said drill bit meets the plug to be drilled, the water being present in an amount of about one-half volume percent, and collection means connectable to a source of low pressure for collecting and removing the air-water mixture and any debris entrained therewith due to drilling the associated plug.

20. The device of claim 19, wherein said pin has threads on said one end thereof and said motor means operates said drill bit in a direction opposite to said threads.

* * * * *